March 12, 1963 D. L. BARRETT 3,080,907
TIRE REPAIR UNIT

Filed March 22, 1961 2 Sheets-Sheet 1

*INVENTOR.*
DONALD L. BARRETT
BY
*J. B. Holden*
ATTORNEY

March 12, 1963 D. L. BARRETT 3,080,907
TIRE REPAIR UNIT
Filed March 22, 1961 2 Sheets-Sheet 2

*INVENTOR.*
DONALD L. BARRETT
BY
*J. B. Holden*
ATTORNEY

United States Patent Office 3,080,907
Patented Mar. 12, 1963

3,080,907
TIRE REPAIR UNIT
Donald L. Barrett, Akron, Ohio, assignor to The Goodyear Tire & Rubber Company, Akron, Ohio, a corporation of Ohio
Filed Mar. 22, 1961, Ser. No. 97,540
5 Claims. (Cl. 152—367)

This invention relates to a tire repair unit and, more particularly, to a tire repair unit or patch adapted to be used inside a tire casing to repair or reinforce an injured portion of the casing. More specifically, it relates to a repair patch which is adapted to be placed over the injury in the carcass and to be vulcanized in such position so as to become an integral part of the casing.

In the art of repairing pneumatic tire casings it is common to use repair units or patches in various shapes consisting of two or more strips or plies of unvulcanized rubber-coated parallel cords with the cords in each strip extending longitudinally thereof and with the strips or plies positioned so that cords of adjacent plies are in crossed relationship. In repairing a hole or injury in the casing this type of patch is placed in the casing and is centered over the injury and so disposed that the cords of the strips or plies of the patch extend in substantially the same direction as the cords in the tire casing. With the patch so located in the casing over the hole therein, the hole is filled with uncured rubber, and the patch and uncured rubber filling are then vulcanized to the casing and become an integral part thereof.

It has been found that with the criss-cross arrangement of strips or plies of the patch arranged as described above, the cord endings terminate at the patch edge in a straight line. In service, the patch edge flexes through a tension and compression cycle as the tire passes into and out of contact with the road surface. This flexing cycle causes a concentration of compression and tension stresses at the ends of the cords of the patch plies which ultimately causes fatigue cracking along the edge of the patch at the terminal endings of the cords. Ultimately, the cracking grows resulting in a complete loosening of the patch from the tire until repair failure takes place.

One of the objects of this invention is to provide a tire repair patch of the general type indicated which is so designed and constructed that the fatigue cracking along the ply edge of the patch is eliminated or greatly delayed.

Another object of the invention is to provide a tire repair patch of the general type indicated which is so designed and constructed that concentrations of tension and compression stresses at the ply edge of the patch are minimized to thereby greatly prolong the life of the completed tire repair.

For a better understanding of the invention reference should be made to the accompanying drawings, in which FIG. 1 is a plan view with parts broken away of a tire repair patch made in accordance with this invention;

Figure 5:
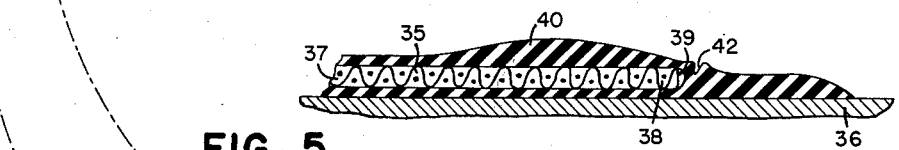
Figure 6:
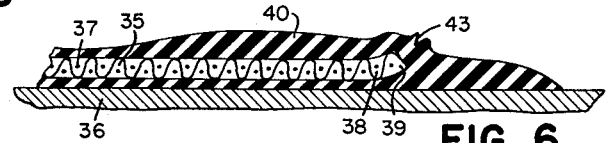
Figure 7:
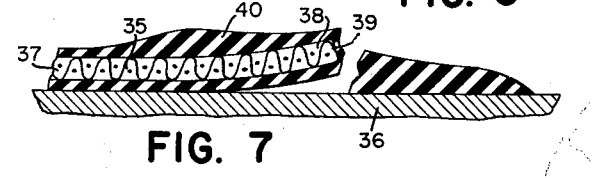

FIGS. 5, 6, and 7 are schematic cross-sectional views of conventional tire patches with parts broken away showing the edge portion of such patches in tension, compression and ultimate failure.

Figure 1:
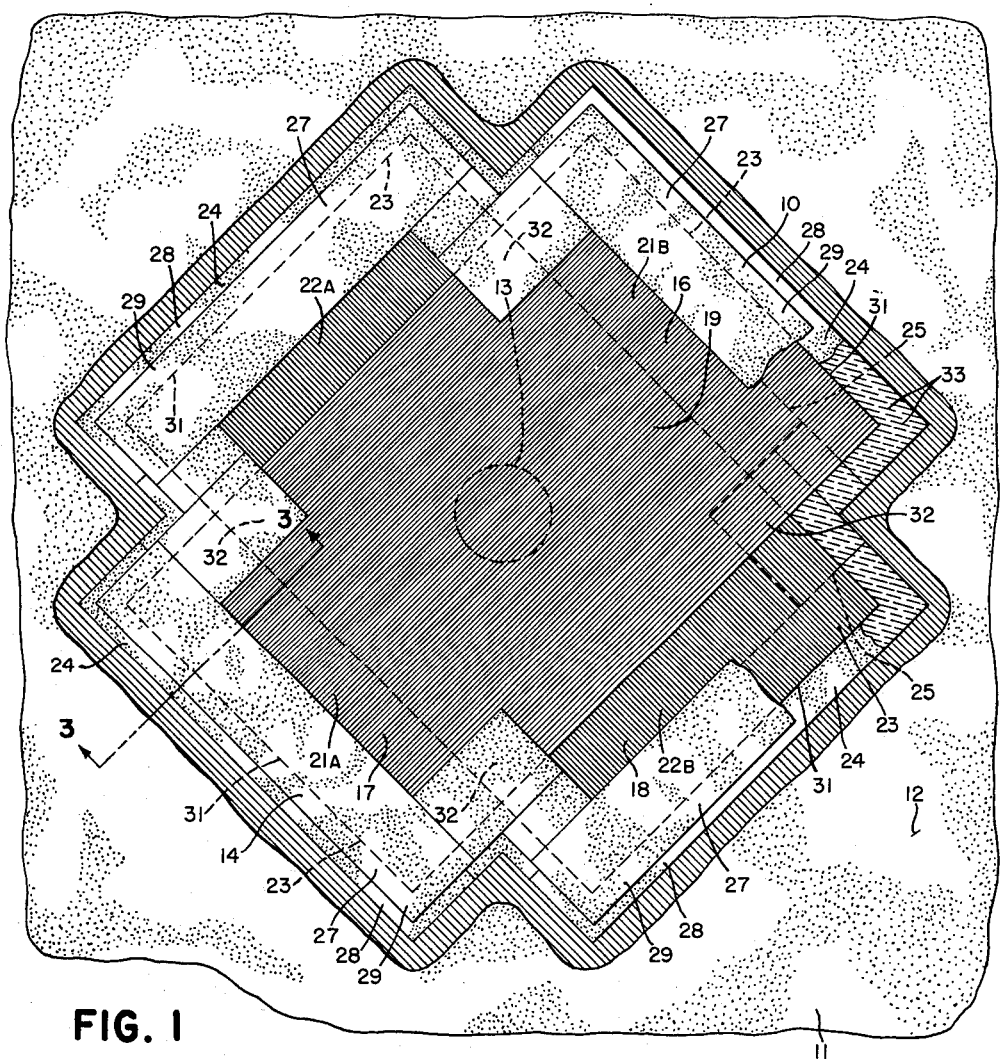

Referring to FIG. 1 of the drawings, a patch 10 made in accordance with this invention is illustrated which is particularly suitable for use in repairing large tires, such as truck tires. This view is a plan view of that side of the patch which will be exposed after the patch has been vulcanized to the interior surface 11 of the tire carcass 12 and over a rubber filled hole or injury 13. The side of the patch 10 which will be exposed or uppermost when the patch is secured to the casing 12 shall be referred to as the "upper" side 14, and the side of the patch which will be secured to and vulcanized to the carcass 12 shall be referred to as the "lower" side 15. Patch 10 comprises one or more strength units 16 formed of a plurality of parallel cord plies, preferably two plies 17 and 18. The direction of the parallel cords of the ply 17 is at an acute or at a right angle to the cords of the ply 18. The strips or plies 17 and 18 of each strength unit 16 are superimposed at cross relationship with the lengths and widths of each ply 18 and 17 being equal. Thus, when superimposed the plies 18 and 17 form a two-ply central area 19 and a single-ply outer tab portion 21a and 21b, and 22a and 22b.

Although only one strength unit 16 comprised of the two plies 17 and 18, is shown in the drawings for purposes of illustrating this invention, it is to be understood that two or more such strength units comprising two crossangled plies similar to plies 17 and 18 may be assembled into the patch 10. However, the subsequent strength units are each made of slightly lesser dimensions than the unit formed by the plies 18 and 17 and such subsequent units are positioned on the "lower" side 15 of the larger units so that in the final assembly of such strength units the overall dimensions and area of each unit decrease toward the lower side of the patch.

Figure 3:
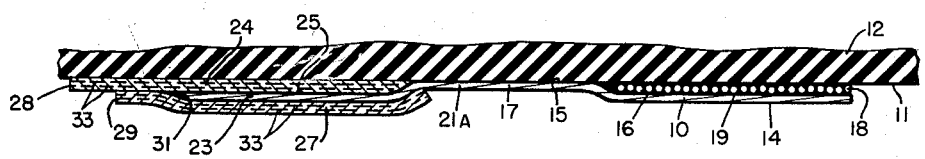
FIG. 3 is an enlarged sectional view with parts broken away taken along the lines 3—3 of FIG. 1.
Figure 2:
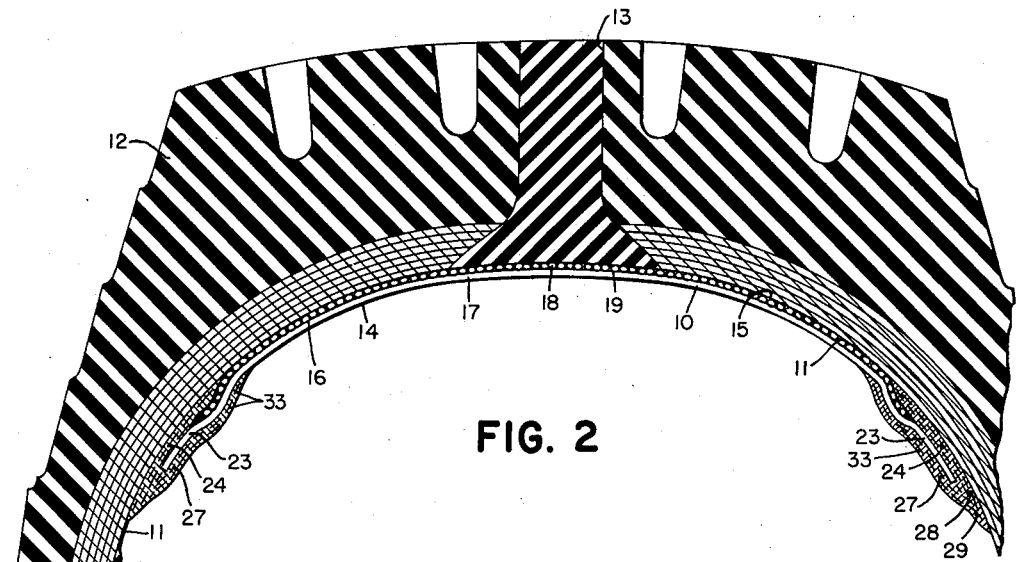
FIG. 2 is a cross-sectional view through a tire and the repair patch of this invention secured thereto.

Patch 10 in accordance with this invention is provided at the periphery or marginal edge 23 of the plies 17 and 18 with a strip 24 of fiber reinforced unvulcanized rubber stock, the inboard edge 25 of which is secured to the marginal edge 23 of the tab portions 21a and 21b, and 22a and 22b, as shown in FIGS. 1 and 3 of the drawings. A similar strip 27 of fiber reinforced stock is secured to the upper side of the marginal edge 23 of the tab portions. The outboard ends 28 and 29 of the strips 24 and 27 project beyond the edge 31 of the tab portion and are secured in face-to-face contact. The strips 24 and 27 overlie the corners 32 of the central area 19. It is thus seen that the projecting edges 29 and 28 as shown in FIG. 2 of the drawings merge without substantial abruptness and completely encase or envelop the marginal edges 23 of the patch 10.

The strips 24 and 27 are made of a rubber compound having mixed and embedded therein a multiplicity of discrete metal or textile filaments or textile yarns or cords 33 of a length from ¼ to 2 inches extending in overlapping relationship. Up to 10% by volume of the filamentary material 33 is mixed with 90% by volume of rubber compound, for example, if the filamentary material 33 is steel wire, the wire is preferably brass-coated and up to 9 volumes thereof is mixed with 91 volumes of rubber to make 100 volumes of reinforced compound for the strips 24 and 27. Preferably the strips 24 and 27 are made of a rubber compound reinforced with about 8% by volume of textile filamentary material or short discrete lengths of textile cord. The compound forming the strips 24 and 27 are made by adding the filamentary material to the rubber stock as the stock is being milled. Thereafter the compound is sheeted into a calender to the proper thickness preferably about 1/16″. During the calendering operation the individual filaments, yarns or cords 33 become more aligned or orientated in directions parallel to the movement of the stock through the calendering machine than in a direction transverse thereto. After sheeting of the stock the stock is cut to the proper width preferably transversely to the direction of movement through the calender at an angle of approximately 30° so that in the completed strips 24 and 27 a majority of the short individual discrete filaments, yarns or cords are aligned or orientated in a direction forming an angle of 30° with the edge thereof.

As an example of the effect of such orientation a typical rubber compound having a modulus of 40% elongation of 200 p.s.i. will have when mixed with 3.6% volume of steel filaments a modulus at 40% elongation of approximately 900 p.s.i. in a direction parallel to the direction of calendering and approximately 500 p.s.i. in a direction transverse to the direction of calendering. When 7.5% volume of nylon fibers ½ inch long are mixed with such compound the modulus at 40% elongation is 1800 p.s.i. in a direction parallel to the direction of calendering and approximately 300 p.s.i. in a direction transverse to the direction of calendering.

Obviously then, the modulus of the strips 24 and 27 can be considerably varied within the modulus values set forth above by changing the direction of orientation of the filamentary material within the strips. It has been found that preferably as hereinbefore indicated, optimum distribution of the tension and compression stresses formed at the edge of the patch 10 is attained by cutting the strips 24 and 27 and applying them to the marginal edges of the patch such that the direction of orientation of a filamentary material 33 extends at an angle of approximately 30° relative to the edge of the strips.

Figure 4:
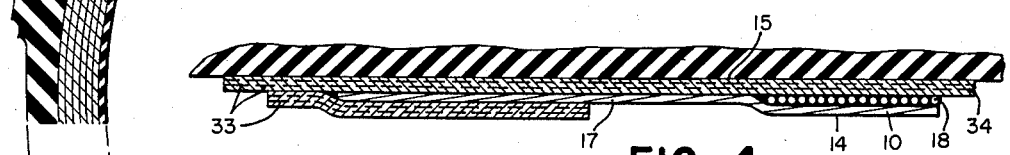
FIG. 4 is an enlarged sectional view with parts broken away, similar to FIG. 3 showing a modification of this invention.

In the modification of this invention shown in FIG. 4 the construction of the patch is identical to that shown in FIGS. 1 through 3 except that the layer 34 of fiber reinforced rubber compound extends across the complete lower side 15 of the patch 10 so that a cushioning medium exists between the patch 10 and the inside surface of the tire carcass. This stiffer cushioning medium is particularly valuable in high-speed operation of the tire over terrain where sharp sudden shock-loads are likely to occur in the repair area of the tire.

Although the patch of this invention is shown in the drawings as having a generally square configuration, it is to be understood that the overall shape of the patch comprising one or more strength units may be of oval, circular, rectilinear or any other shape or configuration.

FIG. 5, through 6, of the drawing is a partial cross-sectional view of the edge of a conventional patch 35 secured to a tire 36 having one or more strength units similar to strength units 16 shown in FIGS. 1 and 2 made of cords 37 terminating in endings 38 at the marginal edge 39 of the pad 35. The edge 39 is covered with a strip 40 of unreinforced gum rubber in the conventional manner. As the tire operates under load, it contacts the road in a flat spot, and as the patch is deflected during rotation in passing through the flat spot, it is compressed, relaxed and tensioned. This compressing, relaxing and tensioning cycle is repeated during each revolution of the tire. Since the cord endings 38 terminate at the marginal edge 39 in aligned relationship and resist deformation, the tension and compression stresses concentrate in the strip 40 adjacent the ends 38 of the cords 37. During the tensioning step of the cycle, the rubber adjacent the cord ends 38 thins out and tends to sheer transversely, or tear, as shown at 42 in FIG. 5. As the compressing step of the cycle occurs, the rubber adjacent the cord ends 38 bulges as the cord endings 38 compress the rubber at 43, as shown in FIG. 6. Ultimately this cyclic stressing causes cracking of the rubber adjacent the cord ends 38 and a complete loosening of the patch from the tire as shown in FIG. 7.

The patch 10 of this invention is applied to the repair area of the carcass and subsequently vulcanized. The strip 24 prevents displacement of rubber from beneath the marginal edge during vulcanization in a mold. During operation of the tire 12 having a patch 10 of this invention the fibrous material in the strips 24 and 27 provides a mechanical tie-in over the patch edge of increased modulus which transfers the stresses from the patch edge to the tire more readily so that the concentration of stresses in the critical area are reduced. Moreover, the strips 24 and 27 resist the extension of any flex fatigue cracking longitudinally of the patch edge as well as in a direction towards the carcass so that the life of the patch is materially increased.

The term "unvulcanized" as used herein refers to rubber which may be either unvulcanized, self-vulcanizing, or unvulcanized vulcanizable stock.

While certain representative embodiments and details have been shown for the purpose of illustrating the invention, it will be apparent to those skilled in this art that various changes and modifications may be made therein without departing from the spirit or scope of the invention.

What is claimed is:

1. A tire repair patch comprising at least one rubber-coated strength unit made of parallel cords, said unit having marginal edges embedded in a fibrous reinforced unvulcanized rubber compound extending beyond said edge and also adhered to the upper and lower surfaces of said marginal edges, said compound having a plurality of short discrete fibrous elements embedded throughout said compound, a majority of said elements extending transversely of said edge.

2. A tire repair patch for tire casings comprising a body formed of a plurality of sheets of vulcanizable rubber coated cord fabric ply members placed consecutively one upon the other, said members so disposed and arranged that fewer plies exist at the margin than at the central portion of said body, the upper and lower surfaces of the marginal edge of said body being adhered to an unvulcanized rubber compound reinforced with less than 10% by volume of short discrete lengths of fibrous material dispersed in said compound, said layer of reinforced compound projecting beyond the marginal edge of said body.

3. A tire repair patch comprising at least one rubber coated strength unit having marginal edges embedded in a fibrous reinforced rubber compound extending beyond said edge and secured to the upper and lower surface of said marginal edge, the entire lower surface of said patch being covered with said reinforced rubber compound, said compound having a plurality of short discrete fibrous elements embedded throughout said compound, a majority of said elements extending transversely of said edge.

4. A tire repair patch for tire casings comprising at least one rubber-coated strength unit made of parallel cords, a narrow strip of unvulcanized reinforced rubber compound adhered to the upper and lower surfaces of the marginal edges of said unit, said strip projecting beyond the marginal edges of said strength unit, said strip of reinforced rubber compound having up to 10 percent by volume of short discrete lengths of fibrous material dispersed therein.

5. A repair tire casing in which the casing is of a multiple ply type having reinforcing cords and in which an injury has occurred, the repair unit vulcanized in position in the tire casing over the injury, said repair unit comprising at least one rubber-coated strength unit made of parallel cords, a narrow strip of reinforced rubber compound adhered to the upper and lower surfaces of the marginal edges of said unit, said strip projecting beyond the marginal edges of said strength unit, said strip of reinforced rubber compound having up to 10 percent by volume of short discrete lengths of fibrous material dispersed therein.

References Cited in the file of this patent

UNITED STATES PATENTS

| | | |
|---|---|---|
| 1,000,781 | Collier | Aug. 15, 1911 |
| 1,518,466 | Stevenson | Dec. 9, 1924 |
| 2,057,797 | Springer | Oct. 20, 1936 |
| 2,802,506 | Agle et al. | Aug. 13, 1957 |
| 2,937,684 | Rockoff | May 24, 1960 |
| 3,004,580 | Chambers et al. | Oct. 17, 1961 |